United States Patent [19]

Myers et al.

[11] 4,085,712
[45] Apr. 25, 1978

[54] ROTARY ENGINE WITH PILOT AND MAIN FUEL NOZZLES DOWNSTREAM OF TOP CENTER

[75] Inventors: David M. Myers, Upper Saddle River; Harold D. Lamping, Oakland, both of N.J.

[73] Assignee: Curtiss-Wright Corporation, Wood-Ridge, N.J.

[21] Appl. No.: 768,050

[22] Filed: Feb. 14, 1977

[51] Int. Cl.² .................................................. F02B 53/10
[52] U.S. Cl. .................................................. 123/205
[58] Field of Search ....................... 123/8.09, 8.11, 8.13

[56] References Cited

U.S. PATENT DOCUMENTS

| 3,246,636 | 4/1966 | Bentele | 418/142 X |
| 3,894,518 | 7/1975 | Gavrun et al. | 123/32 ST X |
| 3,991,723 | 11/1976 | Myers | 123/8.09 |

*Primary Examiner*—Carlton R. Croyle
*Assistant Examiner*—Michael Koczo, Jr.
*Attorney, Agent, or Firm*—Victor D. Behn; Arthur Frederick

[57] ABSTRACT

A rotary combustion engine having two fuel injection nozzles, both mounted in the rotor housing on the downstream side of a trochoid lobe junction in the region in which combustion takes place, with both nozzles discharging in a generally upstream direction and with a spark plug disposed adjacent to the upstream one of said nozzles.

6 Claims, 5 Drawing Figures

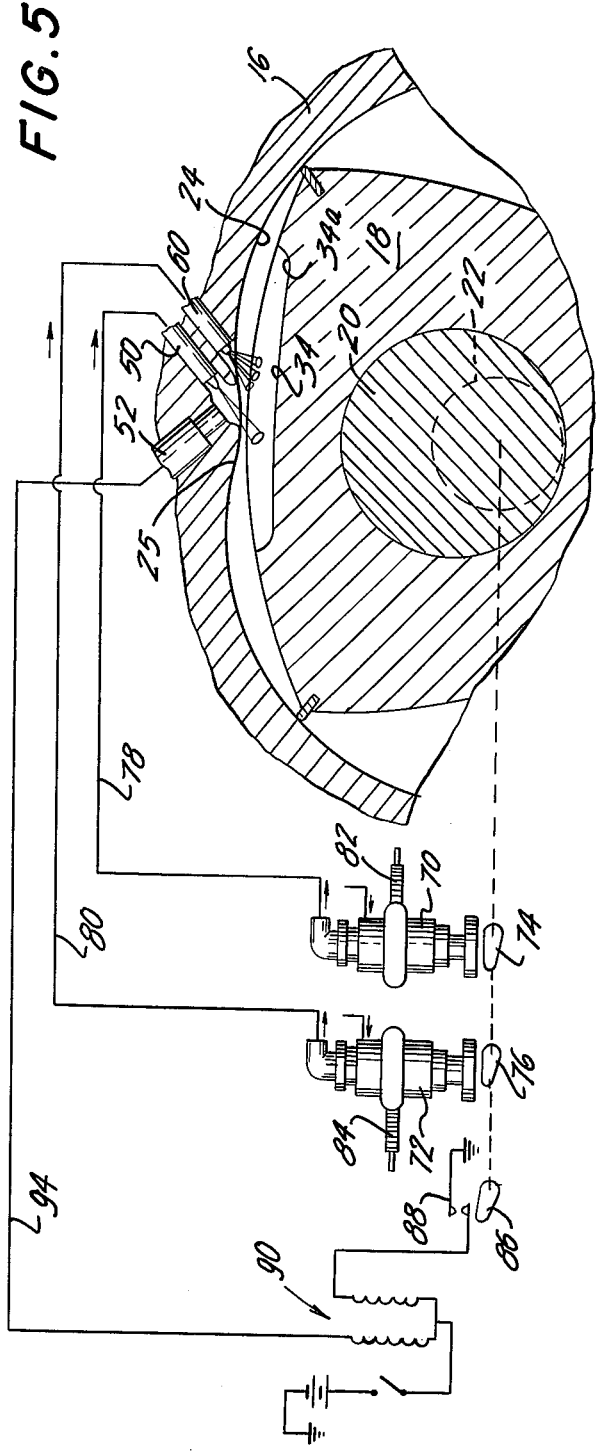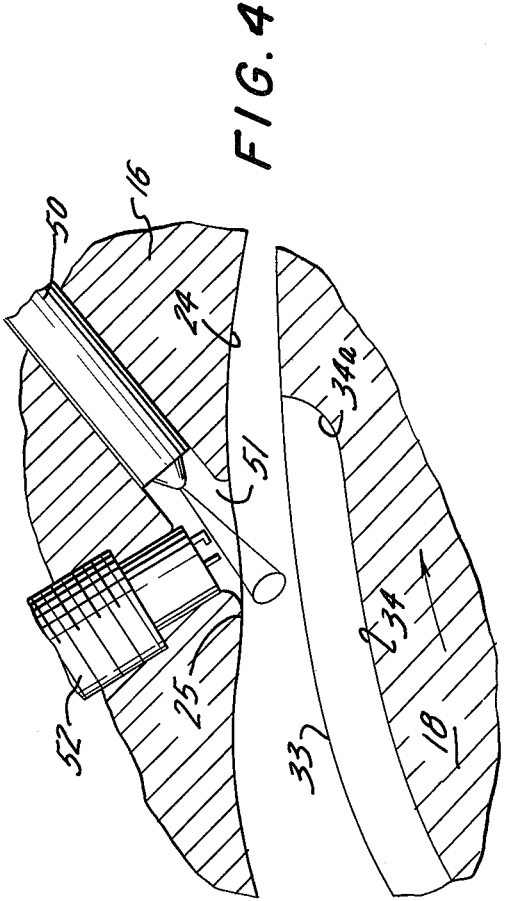

ROTARY ENGINE WITH PILOT AND MAIN FUEL NOZZLES DOWNSTREAM OF TOP CENTER

BACKGROUND OF THE INVENTION

The invention relates to rotary internal combustion engines of the type disclosed in prior U.S. Pat. No. 2,988,065 granted on June 13, 1961 to Wankel et al, and particularly to such an engine designed for operation as a stratified charge engine and employing two high pressure fuel injection nozzles, as disclosed in U.S. Pat. No. 3,894,518 granted on July 15, 1975 to Gavrun et al.

A stratified charge rotary engine, as disclosed in the aforementioned Gavrun et al patent, has been operated by applicants' assignee and has achieved a substantial improvement in fuel consumption and firing regularity over prior stratified charge rotary engines. This successful operation has been achieved with remarkably low quantities of carbon monoxide (CO), oxides of nitrogen ($NO_x$) in the engine exhaust. However, the quantity of hydrocarbons (HC) in the engine exhaust, although less than in prior stratified charge rotary engines, was still higher than desirable particularly in view of exhaust emission standards presently prescribed for the future.

SUMMARY OF THE INVENTION

In view of the foregoing, an object of this invention is to modify a rotary engine of the type shown in the Gavrun et al patent so as to reduce the quantity of HC in the engine exhaust.

The rotary engine disclosed in the Gavrun et al patent has two high pressure fuel injection nozzles, a first nozzle which is combined with a spark plug to provide a pilot flame for igniting fuel supplied through a second or main nozzle. In the configuration of the Gavrun et al patent, the pilot nozzle is disposed upstream of one of the lobe junctions of the multi-lobe inner surface of the rotor housing while the main fuel nozzle is disposed downstream of said lobe junction. Unless otherwise specified, all directions such as upstream or downstream are intended herein to be relative to the direction of rotor rotation.

Thus, in the Gavrun et al arrangement, the pilot fuel nozzle directs its fuel spray substantially directly toward the rotor during at least a major portion of its period of fuel discharge. Because of the relatively low temperature of the rotor working faces compared to combustion temperatures, any such direct impingement of fuel on the rotor working faces results in an increase in the HC exhaust emissions from the engine as well as the formation of carbon deposits on the rotor. In accordance with the present invention, both the pilot fuel nozzle and its igniter, and the main fuel nozzle are disposed adjacent to and downstream of the lobe junction on the combustion side of the multi-lobe housing surface. In addition, the pilot fuel nozzle is oriented so as to direct its fuel spray in a generally upstream direction into each working chamber and the main fuel nozzle is oriented so that at least a major portion of its fuel spray pattern is also directed in said upstream direction. With this arrangement of the two fuel nozzles and since the fuel discharge from said nozzles into each working chamber is initiated before the rotor reaches its top-dead-center position for that chamber, at least a major portion of the fuel discharged into each working chamber is directed at a low angle to the rotor working face thereby minimizing direct impingement of fuel on the rotor.

Furthermore, compared to the Gavrun et al arrangement, location of the pilot nozzle downstream of the lobe junction on the combustion side of multi-lobe housing surface results in locating this nozzle in a region of higher heat flow into the rotor housing from the combustion gases and, therefore, in a region of higher housing temperatures. This is important because in order to accommodate its spark plug, the discharge end of this pilot nozzle is retracted a substantial distance into a recess in the engine housing and, therefore, said higher temperatures will help vaporize the pilot fuel within this housing recess thereby improving the firing regularity of the engine, particularly at low engine powers.

It therefore is a further object of the invention to provide a rotary engine having a high pressure pilot fuel injection nozzle, with its igniter, and a main fuel injection nozzle located adjacent to and downstream of the lobe junction on the combustion side of the multi-lobe surface of the rotor housing with the fuel spray of the pilot nozzle and a major portion of the fuel spray from the main nozzle being directed in a generally upstream direction, relative to the direction of rotor rotation.

It is recognized that FIGS. 7 and 8 of U.S. Pat. No. 3,246,636 granted on Apr. 19, 1966 to Bentele, discloses a rotary engine having a fuel nozzle located downstream of the lobe junction on the combustion side of the multi-lobe surface of the rotor housing. This Bentele patent, however, has only one fuel nozzle so that all the fuel is supplied through its single nozzle. With the engine configuration of Bentele, applicants' assignee has experienced difficulty in operating the engine over the entire operating range with acceptable firing regularity and good engine performance. This difficulty was the stimulus for the pilot and main fuel nozzle feature of the aforementioned Gavrun et al patent, which dual nozzle feature is utilized in the present invention.

With the configuration of the present invention, direct impingement of fuel on the rotor is further minimized by having the leading end of each recess or cavity in the working faces of the rotor extend sufficiently close to the leading end of its working face so that at least a major portion of the fuel from said nozzle is directed into said recesses. In this way the length of the fuel spray path in each working chamber, before there can be any fuel impingement on the associated working face of the rotor, is substantially increased thereby further decreasing such impingement.

Accordingly, it is still a further object of the invention to provide a rotary engine with both a high pressure pilot fuel injection nozzle and a main fuel injection nozzle located adjacent to and downstream of the lobe junction on the combustion side of the multi-lobe surface of the rotor housing with the fuel spray of the pilot nozzle and a major portion of the fuel spray from the main nozzle being directed in a generally upstream direction, and in which the leading end of the recess in each rotor working face is disposed sufficiently close to the leading end of said face that a major portion of the fuel from said nozzles is directed into the recess in each rotor working face.

Other objects of the invention will become apparent upon reading the following detailed description in connection with the drawings.

BRIEF DESCRIPTION OF THE DRAWINGS

FIG. 4 is a sectional view taken along line 4—4 of FIG. 3 and also to a reduced scale; and FIG. 5 is a diagrammatic view showing a portion of FIG. 1 and also showing the fuel control and ignition systems.

DESCRIPTION OF PREFERRED EMBODIMENTS

Figure 1:
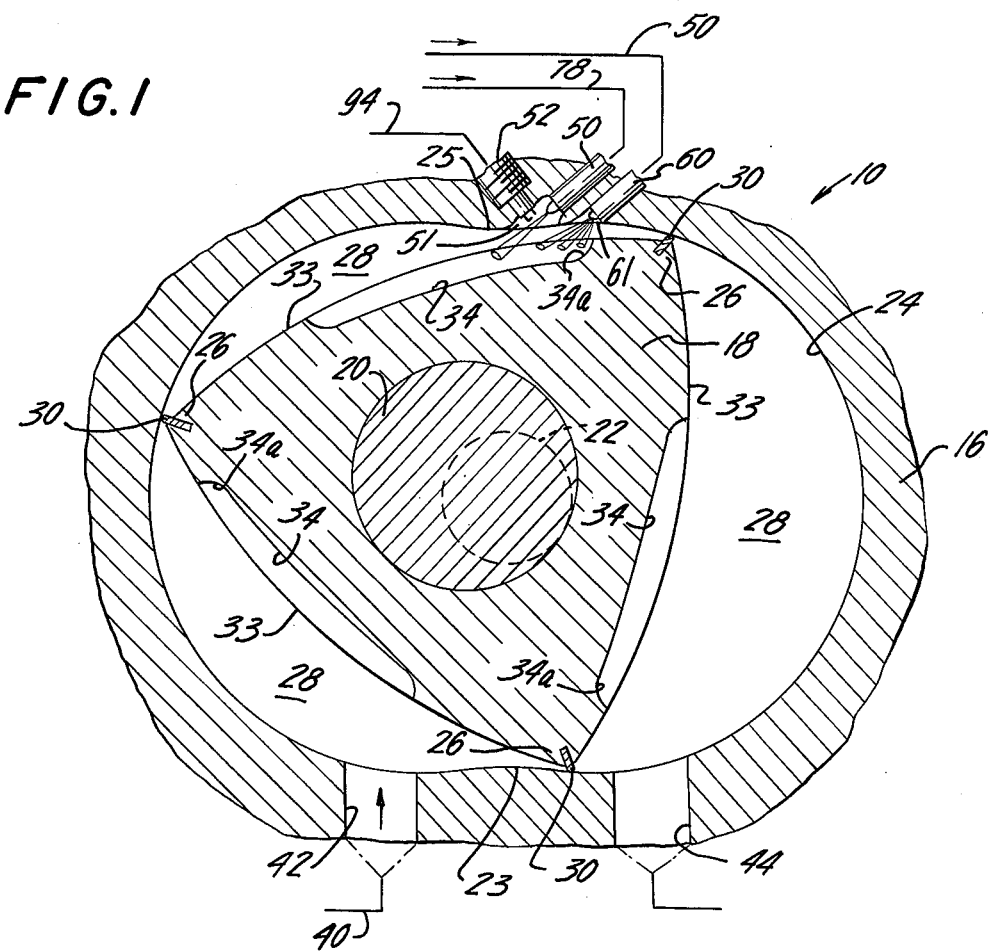
FIG. 1 is a schematic transverse sectional view of a rotary combustion engine embodying the invention.

Referring to the drawing, particularly to FIG. 1, a rotating combustion engine is schematically indicated at 10, the engine being generally similar to the type disclosed in said aforementioned prior patents. The engine 10 comprises an outer body or housing consisting of two axially spaced end housings 12 and 14 (see FIG. 3) and an intermediate or rotor housing 16, the housings being secured together to form the engine cavity therebetween. An inner body or rotor 18 is journaled for rotation within said housing cavity on an eccentric portion 20 of a shaft 22 which extends coaxially through and is supported by bearings (not shown) in the end housings 12 and 14. The axis of the shaft 22 is perpendicular to the inner walls of the end housings 12 and 14.

The peripheral inner surface 24 of the intermediate housing 16 is illustrated as having a two-lobe profile which preferably is basically an epitrochoid, said two lobes joining at junctions 23 and 25. The rotor 18 has a generally triangular profile with apex portions 26 having sealing cooperation with the trochoidal surface 24 to form three engine working chambers 28 between the rotor and the housings 12, 14 and 16. For this purpose, each of the rotor apex portions is provided with a seal 30 which extends across the rotor between the inner walls of the end housings 12 and 14 and the rotor also has suitable seals 32 (see FIG. 3) on its end faces for sealing contact with said end housing inner walls. Each of the three working faces 33 of the rotor preferably is provided with a trough-like recess 34 with each working face 33 extending from one apex seal 32 to an adjacent apex seal.

The engine 10 also includes suitable gearing (not illustrated) between the rotor 18 and the engine housing to control the relative rotation of the rotor, such gearing is conventional and preferably is similar to that illustrated in the aforementioned prior patent to Wankel et al.

An air intake passage 40 supplies air to an air intake port 42 disposed adjacent to and at one side of the junction 23 of the two lobes of the trochoidal peripheral surface 24. Said passage 40 extends through the intermediate housing 16 and the port 42 opens through the inner trochoidal surface 24 of intermediate housing 16. The air intake passage 40 preferably does not have any air throttle valve. An exhaust port 44 is formed in the intermediate housing 16 adjacent to and on the opposite side of said junction 23. The engine combustion is initiated in the engine working chambers 28 in the vicinity of the other junction 25 of the two lobes of trochoidal surface 24.

The engine structure so far described is conventional and is generally similar to that illustrated in the aforementioned prior patents. Reference is made to said prior patents for further details of such an engine including, for example, details of the rotor seals and the gearing between the rotor and housing. With such an engine, during engine operation and with the rotor rotating clockwise, as viewed in FIG. 1, the volume of each working chamber 28 periodically increases from a minimum volume condition, when it is located adjacent to the lobe junction 23 and opens the intake port 42, to a maximum volume condition and closes the intake port and then said chamber decreases in volume to compress its intake charge until the working chamber again reaches a minimum volume condition, but this time at the lobe junction 25. Thereafter the volume of said chamber again increases to a maximum and then decreases to a minimum as the chamber comes into communication with the exhaust port at lobe junction 23 to complete the cycle.

A first fuel nozzle 50 is mounted on the intermediate housing 16 adjacent to the lobe junction 25 and on the downstream side of said junction. The fuel nozzle 50 has its fuel discharge end disposed in a recess 51 opening to the trochoidal surface 24 for discharging fuel into each working chamber after the air-intake charge within the chamber has been substantially compressed and combustion is about to be initiated. A spark plug type igniter 52 is also mounted on the intermediate housing adjacent to the lobe junction 25 and adjacent to the nozzle 50. The electrodes of the spark plug 52 are disposed adjacent to the discharge end of the nozzle 50 preferably so that said nozzle discharge end and the spark plug electrodes both open through the trochoidal surface 24 through the same common recess 51. In addition, the fuel nozzle 50 and spark plug 52 preferably are disposed so that at least a portion of the fuel vapor produced by fuel spray discharged from the nozzle passes in close proximity to said spark plug electrodes immediately as the fuel leaves the nozzle 50 for ready ignition by said spark plug.

As in the aforementioned patent to Gavrun et al, the ignition circuit for the spark plug 52 is arranged to fire the spark plug while fuel is discharging from the nozzle 50 into a working chamber 28 so that a portion of this fuel is ignited at the fuel nozzle 50 as it discharges from the nozzle and the burning of this initial portion of the fuel discharged from the nozzle 50 ignites the balance of the fuel discharging from said nozzle. The timing of the spark from the spark plug 52 is such that it fires during the period of discharge from the nozzle 50 into a working chamber 28 and preferably during the initial period of such discharge into each working chamber 28.

A second fuel nozzle 60 is mounted on the intermediate housing 16 and like the nozzle 50 also adjacent to the lobe junction 25 and on the downstream side of said junction. The main fuel nozzle 60 discharges its fuel through a recess 61 opening through the trochoid surface 24. As in the case of the nozzle 50, the second fuel nozzle 60 is arranged to initiate the discharge of its fuel into each working chamber 28 after the air charge in said chamber has been substantially compressed and combustion is about to be initiated, in a timely manner relative to discharge of fuel from the nozzle 50. For example, at low engine loads discharge of fuel from the main nozzle 60 into each working chamber 28 may be initiated somewhat after fuel is discharged from the nozzle 50 whereas at high engine loads in order to provide time for fuel discharge from the main nozzle 60, the fuel discharge from this main nozzle may be initiated somewhat before fuel is discharged from the pilot nozzle 50. As a result, the combustion flame resulting from the ignition by the spark plug 52 of the fuel discharging from the first nozzle 50 into each working chamber 28 is effective to ignite the fuel discharged from the second nozzle 60 into said chamber. Thus, the burning fuel discharged by the nozzle 50 functions as a pilot flame to ignite the fuel discharged by the nozzle 60.

Figure 3:
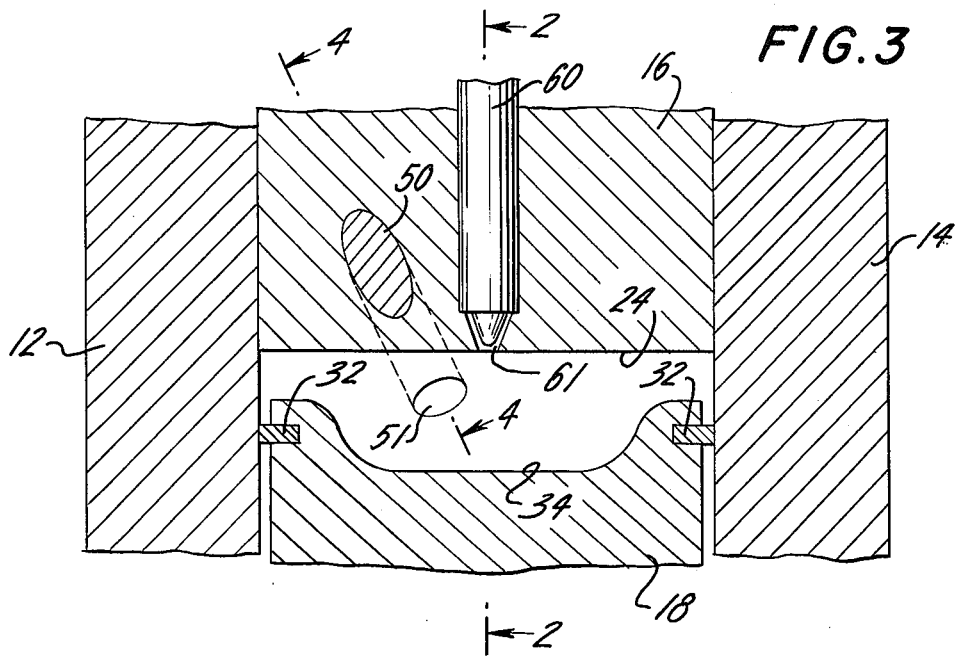
FIG. 3 is a sectional view taken along line 3—3 of FIG. 2 but to a reduced scale.
Figure 2:
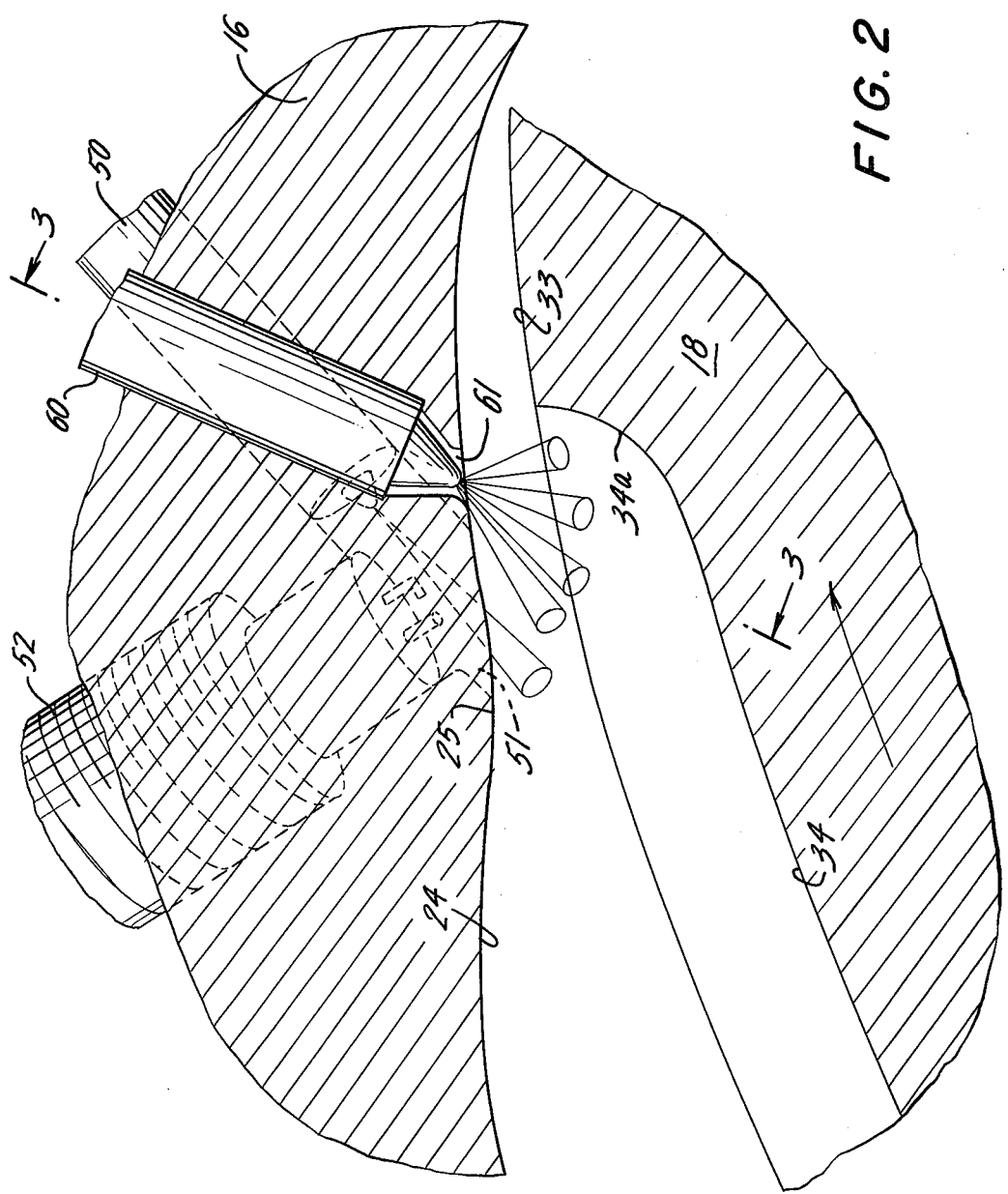
FIG. 2 is an enlarged sectional view showing an actual physical arrangement of the two fuel nozzles shown only schematically in FIG. 1, FIG. 2 being taken along line 2—2 of FIG. 3.

The fuel nozzles 50 and 60 are schematically shown in FIG. 1 as being disposed in tandem relationship on the rotor housing. These fuel nozzles, however, need not be disposed in tandem. For example, in an actual design, shown in FIGS. 2 and 3, in order to physically locate both fuel nozzles 50 and 60 relatively close to the lobe junction 25, the bodies of the two nozzles are spaced axially (along the engine axis) from each other. As seen in FIGS. 2 and 3, the main nozzle 60 is supported on the rotor housing 16 in a plane transverse to the engine axis and midway between the engine side walls 12 and 14. In this way the main fuel supply can readily be symmetrically discharged into each working chamber on both sides of said transverse plane. The pilot nozzle, however, is supported on the rotor housing 16 at an angle to said transverse plane and closer to the side housing 12. In FIGS. 2 and 3, as in FIG. 1, the end of the pilot nozzle cavity 51 at the trochoid surface 24 is disposed upstream (closer to the lobe junction 25) from the end of the main nozzle cavity 61 at said trochoid surface. However, in FIGS. 2 and 3, the pilot nozzle cavity 51 is not symmetrically positioned between the housing end walls 12 and 14. It has been found, however, that burning of the pilot nozzle fuel is not adversely affected by a small amount of non-symmetry.

In connection with FIG. 3, it is noted that this sectional view passes at an angle through the pilot nozzle 50. However, since the details of the nozzle 50 and 60 form no part of the present invention, the section (elliptical) of the nozzle 50 in FIG. 3 is simply shown as a solid section.

As illustrated in FIGS. 1-3, although both nozzles 50 and 60 are located downstream of the lobe junction 25, the pilot nozzle 50 has its discharge end disposed closer to said lobe junction 25 than that of the main nozzle 60. This physical arrangement is preferable because the pilot nozzle 50 in general will discharge before the main nozzle 60 and also because the pilot flame will tend to blow downstream as a result of rotor rotation and, therefore, will more readily ignite the fuel discharged by the main nozzle. The invention, however, is not limited to this physical arrangement. For example, the nozzles 50 and 60 could have their discharge ends disposed side-by-side. Preferably, neither nozzle 50 or 60 should have its discharge opening at the trochoid surface 24 located more than about 15° downstream of the lobe junction 25, as measured about the axis of the shaft 22. If the fuel nozzles 50 and 60 are so disposed relative to the lobe junction 25, then fuel injection into each working chamber can be initiated at the desired time before said chamber reaches its top-dead-center position relative to the junction 25.

The nozzles 50 and 60 are supplied with fuel from positive displacement fuel pumps 70 and 72, respectively. Engine driven cams 74 and 76 are provided for activating the fuel pumps 70 and 72 for supplying a predetermined quantity of fuel to the fuel nozzles 50 and 60 through conduits 78 and 80, respectively, for discharge into each working chamber 28 each time a working chamber reaches a position, such as the upper chamber 28 as viewed in FIG. 1, preferably just prior to the working chamber reaching full compression or top-dead-center position adjacent to the lobe junction 25. Each pump 70 and 72 includes means such as the linearly movable racks 82 and 84, respectively, for varying the effective strokes of the pumps so as to regulate the amount of fuel delivered to the nozzles 50 and 60. The power output of the engine is primarily controlled by regulating the supply of fuel to the main nozzle 60. An additional engine driven cam 86 is provided to operate the make-and-break contacts 88 of the ignition circuit 90 connected to the spark plug 52 by the wire 94. The details of these ignition and fuel systems may be similar to that described in the aforementioned patent to Gavrun et al and the operation of the engine 10 is essentially similar to that described in said Gavrun et al patent. Hence, the engine 10 is operable on various types of fuels, including low octane types of fuel such as kerosene and diesel fuels as well as gasoline.

With the present invention, however, and as shown in FIG. 1, the pilot nozzle 50 discharges its fuel in a generally upstream direction relative to rotor rotation and the main nozzle 60 discharges at least a major portion of its fuel in said upstream direction and both said nozzles discharge from the donwstream side of the lobe junction 25 on the combustion side of the trochoid surface 24. As a result, both the fuel spray from the pilot nozzle 50 and the fuel spray from the main nozzle 60 are both directed at only a small angle relative to the rotor working faces 33 throughout at least a major portion of the period of fuel discharge. This is particularly true if, as illustrated by the position of the rotor 18 in FIG. 1, the leading edge 34a of each rotor recess 34 is disposed sufficiently close to the leading end of its working face 33 so that at least a major portion of the fuel from the two nozzles is directed into said recesses. As a result, direct impingement of both the pilot and main fuel from the nozzles 50 and 60 on the working faces 33 of the rotor 18 is minimized. This feature is quite important since during engine operation the working faces 33 of the rotor are at a relatively low temperature compared to the combustion temperatures and, therefore, any direct impingement of fuel on the rotor working faces tends to increase the formation of carbon deposits on said rotor faces and to increase the HC exhaust emissions from the engine.

As described, both fuel nozzles 50 and 60 have their discharge ends disposed on the downstream side of the lobe junction 25. This is a region of higher heat flow into the rotor housing 16 from the combustion process in each working chamber 28 than the region on the upstream side of said lobe junction. Accordingly, location of both fuel nozzles on the downstream side of the lobe junction 25 has the added advantage in that the resulting higher temperatures help to more completely vaporize the fuel as it discharges from the nozzle. This is particularly true in the case of the pilot nozzle 50 since in order to accommodate its spark plug 52, the discharge end of the pilot nozzle 50 is retracted into its cavity 51 a substantial distance from the trochoid surface 24 and, therefore, said higher temperatures help vaporize the pilot fuel in the cavity 51 for ignition by the spark plug 52.

When an apex seal 30 is disposed in the region of the fuel nozzles 50 and 60, the pressure differential between working chambers on opposite sides of said seal is substantially less than what it is when the seal is disposed on the other side of the lobe junction 25. Accordingly, location of both the pilot nozzle 50 and the main nozzle 60 on the downstream side of the lobe junction 25 has the further advantage of minimizing leakage around the apex seal when it passes under said nozzles.

The pilot fuel nozzle 50 preferably has only one orifice and, therefore, discharges its fuel in a single conical jet into each working chamber 28 as shown in FIGS. 1 and 2. The main fuel nozzle 60, however, preferably is a showerhead-type nozzle for not only spreading its fuel axially across each working chamber 28 but also for spreading fuel circumferentially across each working chamber 28, as shown in FIGS. 1 and 3. Although the pilot nozzle 50 discharges its fuel in a generally upstream direction, the burning pilot flame is quickly blown in a downstream direction to ignite the main fuel supplied by the nozzle 60.

The invention is not limited to the specific rotary engine configuration illustrated. For example, the intake port 42 could open through an inner wall of one of the end housings 12 or 14 instead of through the intermediate housing 16. Also, other types of fuel systems could be used for supplying fuel to the nozzles 50 and 60. Also, the trochoid surface 24 could have more than two lobes with the number of rotor apex portions being correspondingly increased. It should be understood, therefore, that this invention is not limited to the specific details of construction and arrangement herein illustrated and that changes and modifications may occur to one skilled in the art without departing from the spirit or scope of the invention.

What is claimed is:

1. A rotary combustion engine comprising:
   a. an outer body having an internal cavity, the inner peripheral surface of which has a multi-lobe profile such that the junctions of said lobes are disposed relatively close to the engine axis;
   b. an inner body of generally polygonal profile having a plurality of apex portions mounted for relative rotation within said outer body cavity with the apex portions of said inner body having sealing cooperation with said multi-lobe peripheral surface to form a plurality of working chambers between the peripheral surfaces of said inner and outer bodies, which chambers vary in volume in response to said relative rotation;
   c. said outer body having an air inlet port and an exhaust outlet port disposed adjacent to and on opposite sides of one of the junctions of the two lobes of said multi-lobe peripheral surface;
   d. a first fuel nozzle mounted on the outer body adjacent to and on the downstream side, relative to the direction of inner body rotation, of a second lobe junction of said multi-lobe peripheral surface adjacent to which combustion takes place and disposed to discharge its fuel through said surface in a generally upstream direction into each working chamber after the charge therein has been substantially compressed;
   e. an igniter mounted on the outer body adjacent to said first fuel nozzle for igniting fuel discharging from said nozzle; and
   f. a second fuel nozzle mounted on said outer body adjacent to and on the downstream side of the said second lobe junction and disposed to discharge its fuel through said surface into each working chamber also after the charge therein has been substantially compressed for ignition by the burning of the fuel discharged from said first nozzle, a major portion of the fuel discharging from said second nozzle being directed in a generally upstream direction into each working chamber.

2. A rotary combustion engine as claimed in claim 1, in which the peripheral surface of the inner body has a plurality of circumferentially-spaced working faces each extending between a pair of adjacent apex portions of said inner body with each working face having a trough-like recess therein and with the leading end of each said recess being disposed sufficiently close to the leading end of its working face so that with fuel discharged from said nozzles into each working chamber being initiated after substantial compression in said chamber but before said chamber reaches its top-dead-center position, a major portion of said fuel is directed toward the recess in the inner body working face of said chamber.

3. A rotary combustion engine, as claimed in claim 1, in which said first fuel nozzle has its discharge opening on said multi-lobe peripheral surface disposed upstream of the discharge opening of said second fuel nozzle on said surface.

4. A rotary combustion engine, as claimed in claim 1, in which said second fuel nozzle has its discharge opening on said multi-lobe peripheral surface disposed approximately mid-way between the axial ends of said surface and the first fuel nozzle has its discharge opening or said surface disposed upstream from and axial to one side of the discharge opening for the first nozzle.

5. A rotary combustion engine, as claimed in claim 1, in which the peripheral surface of the inner body has a plurality of working faces each extending between adjacent apex portions of said inner body with each working face having a trough-like recess therein with the leading end portion of each said recess being sufficiently close to the leading end of its working face so that each of said nozzles can be arranged so that the initial portion of the fuel discharged thereby into a working chamber is directed toward said recess.

6. A rotary combustion engine, as claimed in claim 1, in which said peripheral surface has two lobes and is basically an epitrochoid and said inner body has three apex portions and in which said first and second fuel nozzles are spaced downstream from said second lobe junction by no more than about 15° as measured about the axis of the epitrochoid surface.

* * * * *